United States Patent

Chang et al.

[11] Patent Number: 5,974,201
[45] Date of Patent: *Oct. 26, 1999

[54] SMART IMAGE SYSTEM

[75] Inventors: Shi-Kuo Chang, Mt. Lebanon, Pa.; Tai-Yuan Hou, Robbinsville; Arding Hsu, Kendal Park, both of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,592

[22] Filed: Jul. 3, 1997

Related U.S. Application Data

[63] Continuation of application No. 08/724,382, Oct. 1, 1996, abandoned.

[51] Int. Cl.[6] .................................. G06K 9/54; G06K 9/60
[52] U.S. Cl. ................................... 382/305; 382/128
[58] Field of Search ..................... 382/131, 132, 382/100, 243, 305, 306, 128; 707/102, 104; 128/922, 924

[56] References Cited

U.S. PATENT DOCUMENTS

| 5,204,947 | 4/1993 | Bernstein et al. | 395/157 |
| 5,255,187 | 10/1993 | Sorensen | 382/6 |
| 5,257,349 | 10/1993 | Alexander | 395/161 |

OTHER PUBLICATIONS

A. Del Bimbo, M. Campanai, and P. Nesi, Using 3D Spatial Relationships for Image Retrieval by Contents, Technical Report, University of Florence, Italy, 1992.

Y. Bizais, B. Gibaud, A.M. Forte, F. Aubry, R.D. Paola, and J.M. Scarabin, "A Qualitative Approach to Medical Image Data Bases," in SPIE Conf. on Image Processing, Medical Imaging V, pp. 156–167, San Jose, CA, Feb. 1991.

S.K. and J.M. Chang, "Database Alerting Techniques for Office Activities Management," *IEEE Transactions on Communications*, vol. COM–30, No. 1, pp. 74–81, Jan. 1982.

H.V. Jagadish and L. O'Gorman, "An Object–Model for Image Recognition," Computer, vol. 22, pp. 33–41, 1989.

S.K. Chang and A. Hsu, "Image Information Systems, Where Do We Go From Here?," IEEE Trans. Knowledge and Data Engineering, Oct. 1992, vol. 4, No. 5, Oct. 1992, pp. 431–441.

M. Chock, A.F. Carenas, and A. Klinger, "Data base structure and manipulation capabilities of a picture database management system (PICDMS)," IEEE Trans. on Pattern Analysis and Machine Language, vol. PAMI–6, No. 4, pp. 484–492, 1984.

(List continued on next page.)

*Primary Examiner*—Phuoc Tran
*Attorney, Agent, or Firm*—Adel A. Ahmed

[57] ABSTRACT

In an image processing system, smart images are provided with a structure consisting of a raw image with a knowledge structure. Each smart image is processed as an object, and reacts via its knowledge structure to environmental changes and/or queries for carrying out certain actions, and for preprocessing image data in anticipation of a user's future requirements relative to a given protocol.

14 Claims, 9 Drawing Sheets

OTHER PUBLICATIONS

C.R. Dow, S.K. Chang, and M.L. Soffa, "A Visualization System for Parallelizing Programs," Proceedings of Supercomputing 92, Minneapolis, Minnesota, Nov. 16–20, 1992.

A.M. Forte and Y. Bizais, "Multimodality Medical Image Interpretation Sytem Implementation and Integration," in SPIE Conf. on Image Processing, Medical Imaging VI, pp. 204–214, Newport beach, Feb. 1992.

A.M. Forte, M. Bernadet, F. Lavaire, and Y. Bizais, "Object Oriented Versus Logical Conventional Implementation of a MMHS," in SPIE Conf. on Image Processing, Medical Imaging VI, pp. 215–224, Newport Beach, Feb. 1992.

W.I. Grosky, "Iconic Indexing Using Generalized Pattern Matching Techniques," Computer Vision, Graphics, and Image Processing, vol. 35, pp. 308–403, Academic Press Inc., 1986.

W.I. Grosky and Z. Jiang, "A Hierarchical Approach to Feature Indexing," SPIE/IS&T Conference on Image Storage and Retrieval Systems, pp. 9–20, Feb. 1992.

A. Gupta, T.E. Weymouth, and R. Jain, "Semantic Queries with Pictures: The VIMSYS Model," Preceedings of VLDB'91, pp. 69–79, Barcelona, Spain, Sep. 1991.

T.Y. Hou A. Hsu, P. Lui, and M.Y. Chue, "A Content–Based Indexing Technique Using Relative Geometry Features," SPIE/IS&T Symposium on Electronic Imaging Science and Technology, Conference on Image Storage and Retrieval Systems, pp. 59–68, San Jose, CA, Feb. 1992.

T. Joseph and A.F. Cardenas, "Picquery: A High Level Query Language for Pictorial Database Management," IEEE Trans, on Software Eng., vol. 14, pp. 630–638, May 1988.

P. Kofakis, A. Karmirantzos, Y. Kavaklis, E. Petrakis, and S. Orpananoudakis, "Image Archiving by Content : An Object–Oriented Approach," in SPIE Conf. on Image Processing, Medical Imaging VI, pp. 275–286, Newport Beach, Feb. 1990.

H. Lodder, B.M. Poppel, and A.R. Bakker, "Prefetching:PACS Image Management Optimization Using HIS/RIS Information," in SPIE Conf. on Image Processing, Medical Imaging V, pp. 227–233, San Jose, CA, Feb. 1991.

R. Mehrotra and W.I. Grosky, "Shape Matching Utilizing Indexed Hypotheses Generation and Testing," IEEE Trans. on Robotics and Automation, vol. 5,1, pp. 70–77, Feb. 1989.

Fausto Rabitti and Peter Stanchev, "GRIM DBMS: a Graphical Image Database Management System," Visual Database Systems, IFIP, pp. 415–430, 1989. O.Ratib, "Visualization and Manipulation of Medical Images," in Scientific Visualization and Graphics Stimulation, ed. Daniel Thalmann, pp. 173–181, 1990.

E. Rogers, R.C. Arkin, and M. Baron, Visual Interaction in Diagnostic Radiology, in Proceedings of the Fourth Annual IEEE Symposium on Computer–Based Medical System, pp. 170–177, Baltimore, MD, May, 1991.

N. Roussopoulos and others, "An Efficient Pictorial Database System for PSOL," IEEE Trans, on Software Eng., vol. 14, pp. 639–650, May 1988.

O.R. Liu Sheng and C.P. Wei, "Object–Oriented Modeling and Design of Coupled Knowledge–base/Database Systems," Proceedings of the Eighth International Conference on Data Engineering, pp. 87–105, Tempe, Arizona, Feb. 3–7, 1992.

O.R.L. Sheng, H. Wang, and H.M.C. Garcia, IRES–Image Retrieval Expert System,: in SPIE Conf. on Image Processing, Medical Imaging IV, pp. 832–841, Newport Beach, CA, Feb. 1990.

H.D. Tagare, G.R. Gindi, J.S. Duncan, and C.C. Jaffe, "A Geometric Indexing Schema for an Image Library," Computer Assisted Radiology '91, pp. 513–518, 1991.

B. Farmer, Roger King, and David A. Myers, "The Semantic Database Constructor," IEEE Trans, on Software Eng., vol. SE–11, No. 7, pp. 583–591, 1985.

M.T. Ozsu, U. Dayal, and P. Valduriez (eds), Pre–Proceedings of the Int'l Workshop on Distributed Object Management, Morgan Kaufmann, Edmonton, Canada, Aug. 18–21, 1992.

L.G. Shapiro and R.M. Haralick, "Organization of Relational Models for Scene Analysis," IEEE Trans. on Pattern Analysis and Machine Intelligence, vol. 4, No. 6, pp. 595–602, 1982.

Chang et al., "Smart Image Design for Large Image Databases," Journal of Visual Languages and Computing, vol. 3, No. 4, Dec. 1992, UK, p. 328, line 33, p. 337, line 37.

R. Mehrotra and W.I. Grosky, "Reminds: A Relational Model–Based Integrated Image and Text Database Management System," Proceeding of Workshop of Computer Architecture for Pattern Analysis and Image Database Management, pp. 348–354, Miami Beach, Florida, Nov. 1985.

SMART IMAGE SYSTEM

CROSS-REFERENCE TO RELATED APPLICATION

This is a continuation of Ser. No. 08/724,389 filed Oct. 1, 1996, abandoned.

TECHNICAL FIELD OF THE INVENTION

The present invention relates generally to image information systems, and more particularly to methods for processing the image information or data.

BACKGROUND OF THE INVENTION

Image information is typically much more difficult to process than alphanumeric information. For example, images, unlike alphanumeric text, typically require a long periods of time to access, process, store, retrieve, and distribute, because of the size and internal complexity of the image information. Also, unlike alphanumeric text, images are typically shared by many users as a non-divisible unit of information, in that in most instances users must view an image in its entirety. As a result of these characteristics of image information, evolving information systems strive to reduce the access time for a user to go from one image display to another, and to permit the unitary usage of image information in a heterogeneous distributed environment.

Many different techniques are known in the art for reducing the time required to process image information in what typically encompasses long duration operations. One approach is to increase the transmission capability of the image information system. Another technique is to distribute the image processing computations.

In known information image systems, protocols or pre specified procedures are provided to users of the system, for permitting them to manipulate the image information. For example, in medical imaging systems, physicians may be provided a predetermined diagnostic protocol for examining medical images. As another example, protocols have been developed for office procedures, such as for the circulation of a document from one office to another. Also, it is recognized that when image information is used in a heterogeneous distributed environment, one must insure operational integrity, operational consistency, synchronization, and so forth.

There is an ever expanding use for image information systems as advances are made in hardware and software technology. For example, image information systems are now included in application areas such as geographical information systems (GIS), office automation systems (OA), medical picture archiving and communications systems (PACS), computer-aided designs systems (CAD), computer-aided manufacturing (CAM), computer-aided engineering (CAE), education and training, robotics, multimedia information systems, and scientific databases systems (SBD). It is known in the art that such systems must be improved by decreasing the image delivery time, increasing the accessibility to a desired image associated information, and generally increasing the responsiveness, accuracy, and user friendliness of such systems.

Present research for improving image information systems is centered on content-based indexing, data modeling, tertiary storage structure, and query-by-content, amongst other techniques. Present systems perform image data processing operations such as retrieval, enhancement, transmission, and so forth, by responding to explicit requests from users. Present image information systems are incapable of coding image data for automatically responding to a users real time use of the image data.

The present inventors recognize that image information should be made "intelligent", in order to permit the image data to actively participate in the particular application the image data is be used at a given time. For example, in medical applications, subsequent to examining nuclear images of a patient's heart, a physician may elect to compare images of the same patient at different physiological states, such as exercising state, rest state, emotional state, and so forth. Next, the physician may elect to examine previous images (past histories) followed by checking images from other modalities. The present inventors recognize that image information systems for medical use, for example, can be improved by providing an active image information system capable of monitoring a physicians examination requirements, to provide the image information to a physician immediately subsequent to an examination step, without requiring the physician to retrieve such image information with explicit queries and convert and highlight the images to meet the physicians needs. In other words, the present inventors recognize that image information systems can be improved for various applications, if the images are enhanced with a knowledge structure, whereby the related image information is automatically moved into proper local working storage or memory banks, and the related data automatically pre-processed into appropriate representations, for display immediately at the time required by a user.

SUMMARY OF THE INVENTION

In order to overcome the problems in the prior art, the present inventors have developed an active information system based upon the concept of smart images. In one embodiment of the invention, image information or data is provided with an associated knowledge structure, consisting of protocols, hot spots, active indexes, and attributes, thereby providing a smart image or smart images as the base for an active image information system. The smart images provide the smart image system the means for automating various operations in a given environment, whereby the images themselves automatically respond to environment changes. The active images are provided with the means for predicting the most probable next operation a user will require for processing the image data, whereby such predicting means further includes means for pre-performing certain operations shortly before the operations are needed by a user. In the present invention, the image information includes means for permitting the images to be accessed and/or manipulated as encapsulated objects. The present smart image embodiments of the invention also include means for providing the smart images the capabilities of supporting exception handling, such as supporting jumps in a procedure being carried out by user, and/or supporting operations requested by user that are not defined in a procedure initially implemented by the user. The smart images also includes means for combining hot spots with active indexing. The protocols serve as a user-system interaction model, and the hot spots and active indexes serve as a task model, in the active information system. As a result, the present smart image system provides images as active objects with distributed knowledge.

BRIEF DESCRIPTION OF THE DRAWING

Various embodiments of the present invention are described below with reference to the accompanying drawings, in which like items are identified by the same reference designation, wherein.

DETAILED DESCRIPTION

Figure 1:
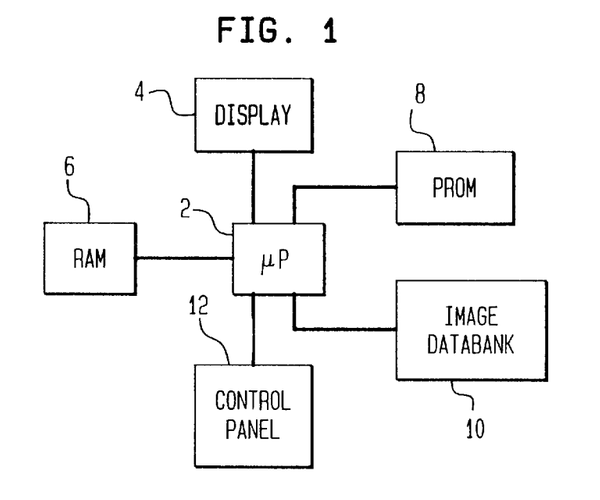
FIG. 1 shows a block diagram of a typical work station for processing image information.

Image data from a large image database is typically processed through use of computerized work stations, for example. Such a work station may include, as shown in FIG. 1, a microprocessor 2; a display 4, such as a video monitor; a random access memory (RAM) 6; a programmable read only memory 8; an image data bank 10; and a control panel 12 that may include a keyboard (not shown), indicator lights, pushbutton switches, and so forth, some of which are discussed below, but none of which are shown. A plurality of similar work stations may be interconnected, for permitting data to be exchanged therebetween. Note that this example of a work station for use with the present invention is provided for purposes of illustration, and is not meant to be limiting. In the example given, image data is stored in the image data bank 10, and operating programs for permitting a user to operate the work station via control panel 12 are stored in PROM 8. The RAM 6 acts a working memory for the microprocessed system. Images being processed are visually displayed on the display 4.

As previously discussed, there are many different types of hardware and software image information systems. For purpose of illustration herein, an example of image processing for medical information will now be given. For example, a physician may process image data at a work station for obtaining a diagnosis of heart disease through use of images from different modalities. The physician may call up on display 4 a nuclear image for making an initial determination as to whether there is any observable abnormality in the heart. If an apparent abnormality is observed, through moving a cursor via controls on control panel 12, or manipulating a mouse device (not shown), the physician can point at and annotate the area associated with a suspected defect. Note that a predetermined protocol showing the various sequence of steps for the physician to conduct the diagnostic study may be presented on a portion of the display 4, for the convenience and use of the physician. The protocol typically is in a form of a flowchart, and is usually not displayed.

Once the physician has identified a suspect abnormality by pointing at the abnormality area in the image, he next proceeds to select an appropriate hot spot from a number of available hot spots. The use of hot spots is known in the art, and will be discussed in greater detail below. When a hot spot is selected, the rule therefore may be visually displayed on display 4. In this example, a hot spot rule may indicate "if there are heart defects, retrieve angio images." However, as will be shown below, unlike prior systems, when the physician reaches a state such as "Examine-Other-Modalities" in the protocol, the present invention will have anticipated the physician's future requirements, and have already placed into the working storage of the system, the RAM 6 in this example, prefetched image data.

In the illustrated system, assume that a physician can retrieve and examine images in the time-domain to determine whether there are any significant differences therebetween. An examination can also be made of the same patient at different physiological states (exercising, normal, excited, etc.) for permitting a physician to determine if there are significant differences in the related heart images, in this example. If the physician decides to examine images from other modalities, for example, by pressing an appropriate button of a switch on control panel 12, for example, even if the protocol state presently being pursued is for a different function or processing, the smart image system of the present invention will automatically jump ahead to the requested out of sequence state "Examine-Other-Modalities", in this example. Greater details are given below.

Upon the system of FIG. 1 entering the jump state "Examine-Other-Modalities", the angio image which has been prefetched for use of the present invention, is immediately displayed on display 4. With this system, the physician can also examine other images from other modalities to determine the congruence thereof. These other modalities can be retrieved through operation of appropriate switches (not shown) on control panel 12. For example, if the focusing area in a nuclear image indicates the lack of a oxygen in a designated portion of the heart, by calling up a angio image thereof, the physician may be able to observe blood vessel narrowing in the corresponding portion of the heart. Use of the present invention also permits the physician, in this example, to use focussing areas to relate nuclear image, ECHO image, MUGA image, and so forth to verify that the detected abnormality is consistent and real. In making the examination, such as determining if the narrowness at the beginning of a blood vessel is a defect, a physician can use the present invention for examining images of normal patients with similar narrowness, for ascertaining whether the narrowness of the patient being studied is truly an abnormality. Through use of the present invention, the physician of this example is provided with the ability to use the image data processing system of FIG. 1 or some similar system, for accessing the records and images of patients with similar problems to the patient under study, for determining how these other patients responded to a treatment plan similar to that developed for the present patient. As will be discussed in further detail below, the previously described known time-consuming operations, can be conducted with significant time saving through use of the present invention. As indicated, these operations may include retrieving related images by similarity, comparing problem areas amongst related images, and accessing images in a heterogeneous distributed environment.

Figure 2:
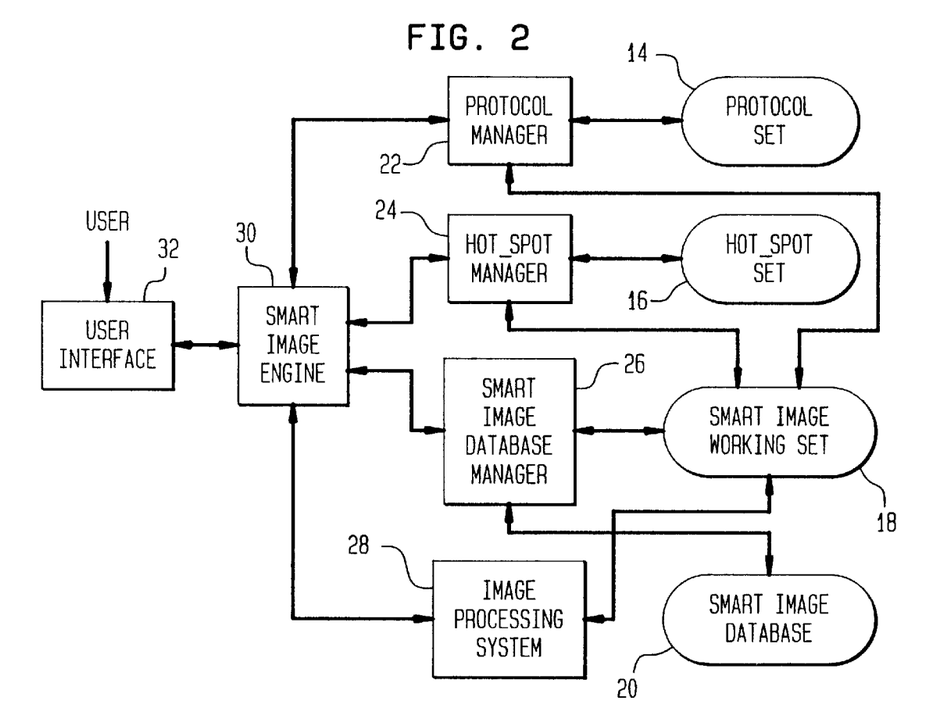
FIG. 2 shows a smart image system for one embodiment of the invention.

In FIG. 2, an overview of a smart image system for one embodiment of the invention is shown (much greater details of various aspects of the invention are given below). There are four data structures, four tools, one control engine, and one user interface shown. The four data structures are the protocol set 14, the hot spot set 16, the smart image working set 18, and the smart image database 20. The protocol set 14 contains various protocols for user-system interaction. Protocols are plans of examination or treatment in the medical domain, for example. The hot spot set 16 contains various hot spots which indicate the approximate locations of problem areas. The smart image working set 18 is the local copy of a set of smart images which are created, retrieved, and updated by the user. It is an encapsulated object (including raw images) and can be carried to another workstation. Smart images in a smart image databases 20 contain various data which includes references to raw images and knowledge structures.

The tools include the protocol manager 22, the hot spot manager 24, the smart image database manager 26, and the image processing system 28. The protocol manager 22 is in charge of protocol creation, update, and retrieval for various users. A protocol editor (not shown) is included in the protocol manager 22. The hot spot manager 26 is in charge of hot spot predicate evaluation and action scheduling and invocation or support obtainment for actions to be taken. It is known in the art to provide a priority control that defines the most important functions that will appear on the menus or will be activated automatically, in order to alleviate the overhead of may choices for the user (see P. Kofakis et al, "Image Archiving by Content: An Object-Oriented Approach," SPIE Conference on Image Processing, Medical Imaging, IV, Newport Beach, Calif., pp. 275–286, Feb. 1990). This scheduling task is performed by the hot spot manager 24. A hot spot editor (not shown) is also included. The smart image database manager 26 manages smart images. A smart image editor (not shown) is included to generate new smart images or to update smart images in the working set. Raw images can be processed by using various image processing routines in the image processing system.

The smart image engine 30 is an event-driven control system which controls the tools. It can invoke the protocol manager 22 to select a protocol from the protocol set 14 for initial study or to check the current status of a protocol for follow-up study. It can invoke the hot spot manager 24 to create a new hot spot or to select or propagate knowledge information to relevant smart images. The function of the smart engine 30 can be described more formally in successive steps as follows:

```
On (event);
Begin;
    Select protocol state from protocol;
    Update smart image;
        Load image set based upon relations
            (links, navigation type, etc.);
        Process image set;
        Interact with user;
        Update knowledge structure;
    Evaluate predicates;
    Schedule and invoke actions;
End.
```

The interface 32 between the user and the system is especially important. The visualization interface should be easy to use, offer immediate feedback to the user and allow interactive user options. A prototype is currently being implemented by the inventors on SUN/SPARC machines under the X window environment.

The smart image system of the present invention, as described above, has the following characteristics:
A. It is proactive: Environmental changes caused by system actions may automatically trigger more actions.
B. It is reactive: Environmental changes caused by users' interaction with images can trigger some actions.
C. It is reflective: Actions activated by conditions on hot spots can change features on these hot spots.

The advantages of using smart images are as follows:
(1) Responsiveness: The smart image system knows what action to take from a user's interaction with the smart image. Therefore, it can provide goal-oriented prefetching, image processing, etc. This implies that time savings in long duration operations can be accomplished.
(2) Adaptiveness: A smart image incrementally increases its intelligence by modifying its knowledge structure to include more information on the usages of the image. Based upon such information, an active index can also be modified to make access more efficient.
(3) Reliability: The smart image is an encapsulated object and can help users to correctly interpret information at any location, thus supporting distributed decision-making in a distributed environment.

Other researchers have advanced some of the concepts related to smart images. Functional images, parametric images, and expert images are known, which are synthetic images created by functional mapping or parametric imaging to allow the depiction of the status of a particular process within an organ (see Ratib, O., "Visualization and Manipulation of Medical Images," *Scientific Visualization and Graphics Simulation*, edited by D. Thalmann, pp. 173–181, 1990). These images are still images without any knowledge.

The smart image approach of the present invention regards images as active objects with knowledge. The concept of active objects has been advanced by researchers previously (P. Kofakis et al, Ibid), but none has combined active objects with images. On the other hand, in image information system technology, researchers have applied the principles of knowledge-based systems, but such knowledge-base is usually centralized and global. In the present smart image approach, knowledge is distributed to the individual image. Previous research has considered images as objects, but none has considered images as active objects with distributed knowledge.

In the present smart image approach, the technique of combining hot spots with active indexing is also considered unique. The smart image of the present invention approach considers hot spots as objects in an object hierarchy, thus enabling the flexible management of hot spots and the automatic creation of new hot spots for smart images, which is believed novel. The active indexing technique of the present invention is based upon Petri-net theory, but with significant differences in its ability to support both passive indexing and active indexing as shown in detail below, the present invention provides the data structure for the similarity retrieval of related images, and also for spatial reasoning.

In the present invention, the protocols 14 serve as the user-system interaction model, and the hot spots and active indexes serve as the task model. Combined together, they serve as a model for designing an active image information system. From a more general viewpoint, any active information system requires these two basic models—interaction model and task model. In the present invention, if the hot spots described below are replaced by database alerters, the present invention can be extended to serve as a generic model for active information system design.

Figure 3:
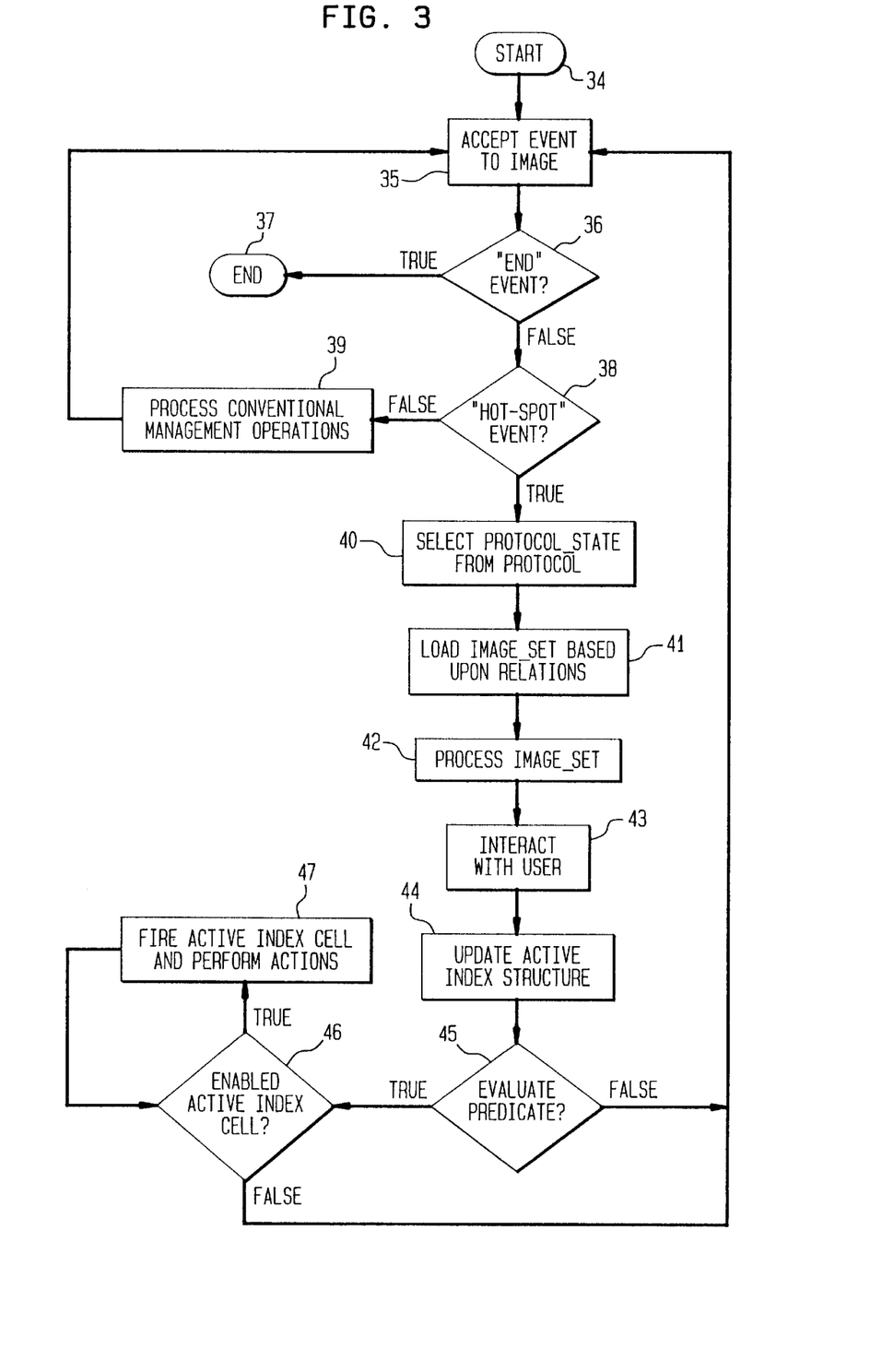
FIG. 3 shows a flowchart of steps required to execute or process a smart image in one embodiment of the invention.

The flowchart of FIG. 3 shows various steps for executing a smart image system of one embodiment of the invention, which will now be discussed with reference to FIGS. 1 and 2. The first step 34, "start", is initiated by a user operating control panel 12 to begin image processing. In step 35, events which are generated from the system-user interface 32, are checked. The "End" event 37 terminates the smart image system, or if it is not a "hot-spot" —related event, then the system enters step 39 for processing the image information in a conventional manner. Otherwise, step 40 is entered into for finding a protocol state from the protocol presently in use. Note that the smart image operating system of FIG. 2 is in this example stored in PROM 8, for permitting a user to carry out the steps of the subject flowchart. After selecting the protocol, the smart image engine 30 through monitoring of the user interface 32 operates the smart image database manager 26 for retrieving portions of the smart image database 20, and smart image working set 18, for loading an image data set based upon relations, as indicated by step 41. In step 42, the system performs image processing for the loaded image data. In step 43, the user is allowed to interact with image data. In step 44, the active image data is updated in accordance with the user's actions, and in subsequent step 45 associated predicates of a hot spot in use are evaluated. If a predicate is found to be false, the system returns to step 35 for accepting another event to image. If the predicate is found to be true in step 45, step 46 is entered. In step 46, if an active index cell (to be described in greater detail below) is enabled, the cell will be fired in step 47 for performing whatever actions are associated with the index cell in relation to processing of the image. The pre-fetching operations can be performed here. Otherwise, the system returns to step 35 for accepting another event to image.

An in depth description of the various embodiments of the present invention will now be given. In the present invention, a smart image is an image with an associated knowledge structure, which knows what actions to take based on the user's interaction with the image and the environmental changes. Here, the environment includes database states, history of previous interactions, and system states.

More specifically, a smart image is an (I, S) pair where I is the raw image 48 (see FIG. 4) and S is its associated knowledge structure. The knowledge structure S further consists of the following: a protocol 14, a set of hot spots 16, active indexes, attributes, and relations to other images. To utilize smart images, a smart image environment is provided with its associated image database.

Figure 4:
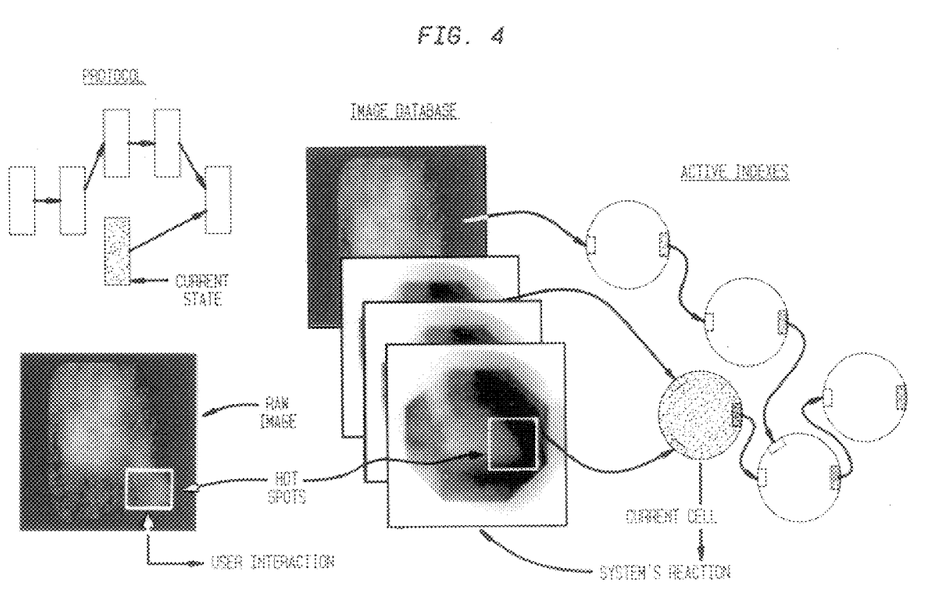
FIG. 4 is a pictorial flow diagram of a smart image structure for one embodiment of the invention.

In FIG. 4, the overall smart image structure in the smart image environment is illustrated. The raw image 48 is the image itself or a pointer to the image. Attributes include domain-related information and traditional image-related information such as patient name, image type, image size, point of view, voice diagnosis, etc. The protocol 14 mimics the user's actions to the image 48. A hot spot 50 is defined for an area of interest in a raw image 48 ("focusing area"), which detects environmental changes, and causes certain actions to be performed. The active indexes 52 connect related images or related hot spots for realizing the system's responses to the environmental changes. If the environmental change is originated from the user by identifying a hot spot 50 in the raw image 48, the smart image system can identify the user's request. At this point, since the current state and its possible future states are known from the protocol 14, further system actions (such as prefetching related images, preprocessing image information, etc.) can be performed before they are actually requested by the user.

The detailed description of protocols 14, hot spots 50, and active indexes 52 will be given in the following sections.

From the object-oriented viewpoint, a smart image is a complex object, with I and S as constituent objects. The knowledge structure S further consists of other constituent objects. This definition facilitates the implementation of the smart image system using an object-oriented approach.

A protocol 14 specifies the general procedure of using smart images. In order to reduce its complexity, the basic components of a protocol 14 are limited to the user's operations that cause environmental changes. A protocol 14 is specified as a tuple: (protocol name, decision graph, protocol state) where the protocol name is the unique identifier of a specific protocol 14, the decision graph (such as flowcharts, Petri nets, program dependency graphs, office procedure models) represents the overall decision flow of image usage in a certain application, and the protocol state is the current state in the protocol (such as marking in Petri net, current stage in flowchart, etc.), during the usage of the smart image.

Protocols 14 are used for two purposes: The first is to identify what operation the user is currently performing on an image in order to take appropriate actions. The second is to predict the user's future actions based on the user's current action. By these two usages, two advantages can be realized: (a) the user need not explicitly specify his/her intended actions to the smart image, because the smart image system uses the protocol 14 to predict the user's intended actions through environmental changes performed by the user; and (b) some time-consuming actions are preperformed by the smart image system before the user actually needs them.

To facilitate the protocol design, decision graphs are used to specify protocols 14. For a "jump" exception, the smart image system detects the user's intended protocol state based on some enabled hot spots 30. When there are multiple protocol states, the system either selects the state based upon a preference function, or enters all such states by regarding the protocol as a probabilistic automata. For the "not-defined operation" exception, the system knows it is a deviation from the protocol 14. Predefined exception-handling routines can be invoked to handle such exceptions. Furthermore, subsequently the system may use learning algorithms to incorporate this currently undefined operation into the protocol.

To facilitate the protocol design, decision graphs are used to specify protocols 14. Among a variety of decision graphs, the flowchart method is used. Flowcharts could become as detailed as possible to include all activities related to the image. This may cause confusion between the usage of the image and the system reactions to the user's actions. In order to avoid such confusion, the protocols are confined to the user's actions and the outcome of the system responses. The system's detailed operations are implicitly abstracted such that they are specified by active indexes 52. In this way, flowchart designs can be clean and clear.

Figure 5:
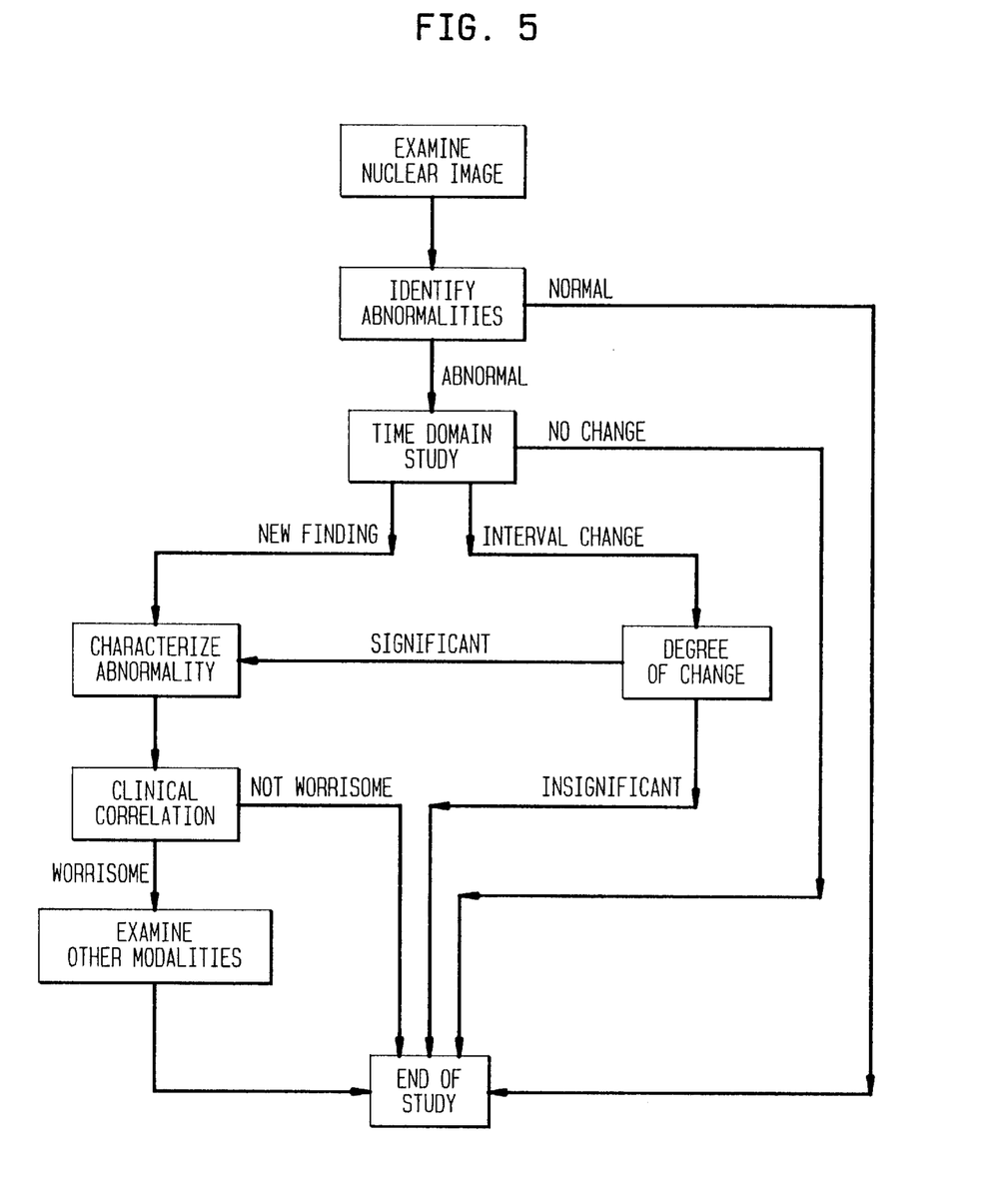
FIG. 5 is a flowchart of a protocol for use in one embodiment in application of the invention.

For the flowchart approach, each flowchart graphically consists of boxes connected by arrows (see FIG. 5). A box contains one or more user's actions to the smart image. System reactions to the user's actions are implicitly abstracted in the same box. The system's corresponding outcomes are routed to other boxes connected by arrows. There are two possible connections between boxes. The first one is when A and B are user's actions and action A is followed by action B. It indicates that the system response to action A produces only one outcome, and that such outcome will only lead to the possible user's action B. The second possibility is when A,B,C, are the user's actions and A is followed by either B or C, depending on the outcome of the system response to the action A. In general, A can be followed by zero or more actions.

In the medical field, physician's diagnostic procedures have been well studied in the literature (see Y. Bizais, et al, "A Qualitative Approach to Medial Image Data Bases", *SPIE Conf. on Image Processing, Medical Imaging V*", San Jose, Calif., pp. 156–167, Feb. 1991). From these research studies, it can be observed that the protocol in the smart image not only closely matches a physician's diagnostic procedures, but also achieves a physician's expected goals in both acquisition and analysis.

In FIG. 5, a protocol 14 is represented by a flowchart. As discussed above, protocols 14 can also be modeled by Petri nets, which may be useful for applications such as office automation or factory automation. For more defined specification, program dependency graphs (PDGs) can also be used.

A hot spot 50 is defined as an area of interest in an image where environmental changes are detected. Such detection triggers some system actions. In order to accomplish this task, each hot spot 50 is composed of two components: predicate and action, denoted as a (predicate, action) pair. For example, a medical diagnostic hot spot rule is: "if there are defects of the heart shown in the nuclear images and the patient health is permissible, then do an angio study".

At a given state of the protocol 14, only certain hot spots 50 are enabled when their predicates are evaluated "true". The associated action(s) of enabled hot spots 50 are scheduled and performed. Such action(s) may be the direct consequence of the hot spot rule, for example, the prefetching of related images from the image database 20. The action may also be the passing of a message to another cell in the active index structure as described below. In the latter case, hot spots 50 may lead indirectly to subsequent actions.

As an example, the hot spot rule "[Exist tumor in area(A), Retrieve previous images]" checks if there is an existing tumor in an area of interest (A) pointed at by the user. The action "Retrieve previous images" is executed if such a tumor exists.

As another example, the hot spot rule "[Tumor size diff(current-image, stored-image)>0.4, Perform exam]" will execute the action "Perform exam" if the percentage difference of the size of the tumor between the current image and the stored image is greater than 0.4. The event which triggers the execution of this hot spot may come from the intent of the user, or from the system action, such as "check if the tumor is getting bigger". In this example, the action "Perform exam" may take hours or even days to finish.

Figure 6:
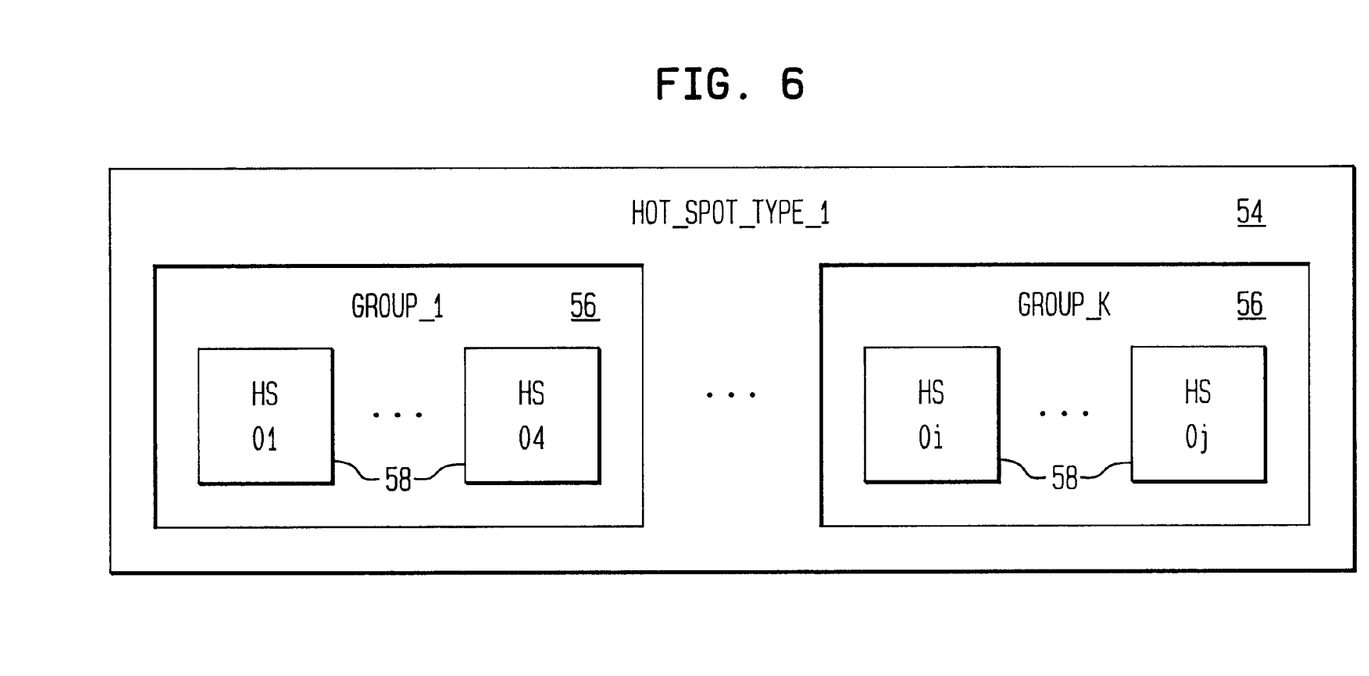
FIG. 6 is a pictorial representation of hot spot types and groups for use in various embodiments of the invention.

Since hot spots 50 are themselves objects, one can consider an object hierarchy of hot spots. One can first distinguish different hot spot types. Within each hot spot type, there are different hot spot groups, and within each group there are hot spot instances. This is illustrated in FIG. 6 showing the type of hot-spot 54; group 56 of hot-spot instances; and hot-spot instances 58.

A hot spot group 56, for example, may consist of all the hot spot instances 58 of images of the same patient. The creation of a hot spot instance 58 will then lead to the creation of hot spot instances 58 for other images of the same patient. A hot spot group 56 may also consist of hot spot instances 58 of images of different modalities. In which case, the size of a hot spot 50 must be recomputed for the image of the different modality. Therefore,the hot spot hierarchy defines the links between smart images. The updating of a hot spot 50 will lead to the automatic updating of other hot spots 50 via these links.

Active indexes 52 (see FIG. 4) are used to relate the environmental changes to the system reactions and to realize system actions. The main effect is token flow along arcs 60 in the active index 52 and the side effect is to perform certain actions. A token digitally represents information such as the location of the hot spot in an image, or other information related to the image. Three ways of combining active indexes 52 with other smart image components can be identified as follows:

Links in the hypertext sense:

Links can be set up for related images, such as a sequence of patient heart images in one study. Links are used by active indexes 52 to perform some related images. For example, the finding of a tumor in one image 48 can be propagated to update other related images.

Feature-based indexes:

These refer to the connection of hot spots 50 to the first-level cells in an active index 52 structure as shown in FIG. 4. They are used by the active index 52 to perform some actions which are only conducted when hot spots 50 satisfy spatial relations. One example is if both tumors of the current and previous heart images exist, then the active index performs the comparison operation of these two tumors.

Spatial relations to other images:

Spatial features in the image can be used to retrieve related images by similarity of spatial relations. One example of using spatial relations is the retrieval of all similar tumor images across different patients. This is a passive index method. However, as will be explained below, the input/output reversal of active index cells 59 (see FIG. 4) enables the active index to be performed as a passive index.

The active index 52 structure will now be explained in more detail.

Figure 7A:
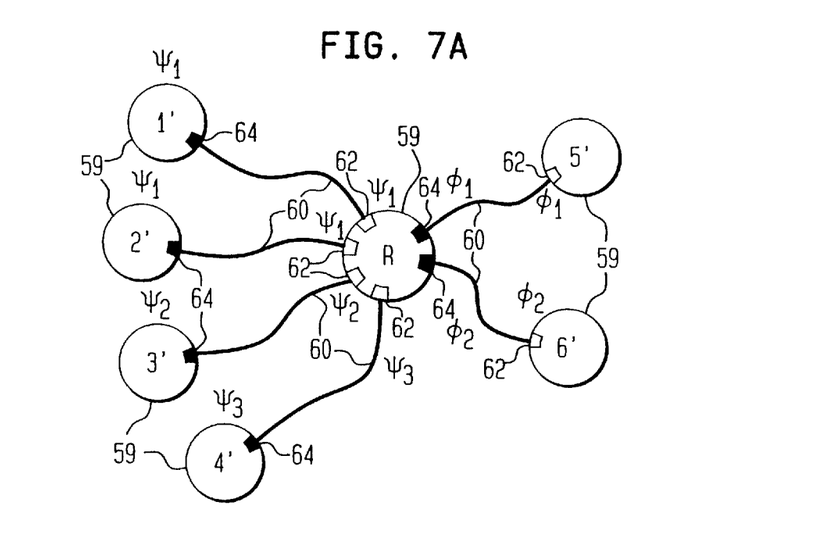
FIG. 7A shows an active index cell for one embodiment of the invention.

An active index structure 52 consists of active index cells 59 connected by arcs 60. In FIG. 7A, an active index cell 59 is illustrated. Each cell 59 has a number of input slots 62 and Ioutput slots 64. Each input slot 62 (white slots) is connected to the output slot 64 (black slots) of another cell 59, and each output slot 64 is connected to an input slot 62 of another cell 59. The connected pair of input and output slots 62 and 64 must have the same predicate. A cell 59 labeled R is enabled if a token satisfying the input predicate flows into the cell. When the cell R is fired, one token each will flow to the input slot 62 of another cell 59 provided that the token satisfies the output predicate. The predicates in FIG. 7A are designated by $\phi_1$, $\phi_2$, $\psi_1$, $\psi_2$, and $\psi_3$.

Figure 7B:
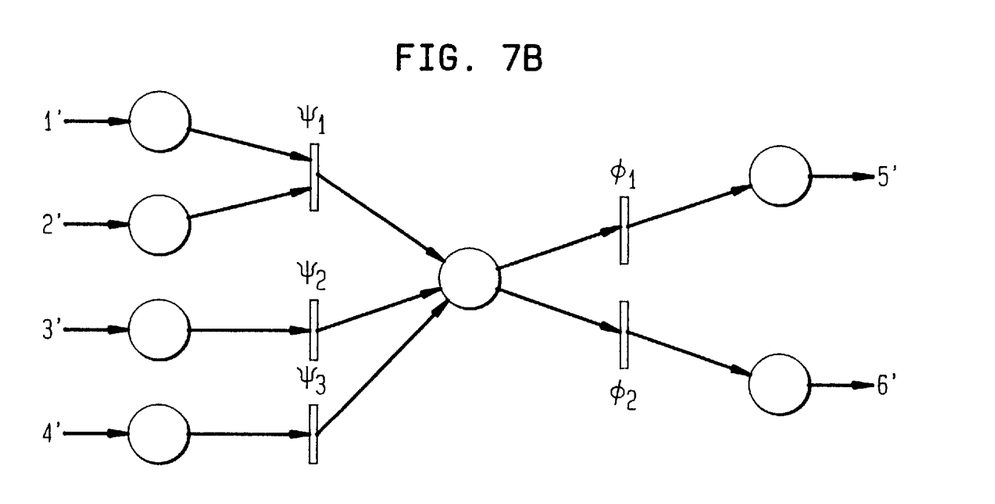
FIG. 7B shows an equivalent Petri-net structure that is equivalent to the active index cells shown in FIG. 7A.

When several input slots 62 have identical predicates, they must all have tokens satisfying the predicate, before R is enabled. The equivalent Petri-net structure is shown in FIG. 7B. Input slots with identical predicates are converted to transitions leading to output places.

In feature-based indexing, the first-level cells are triggered by the detection of certain features in the image 48 (such as blood vessel occlusion). The combined occurrence of certain features will then lead to the firing of higher level cells 59. The connecting lower level cells 59 will then invoke actions.

Figure 8:
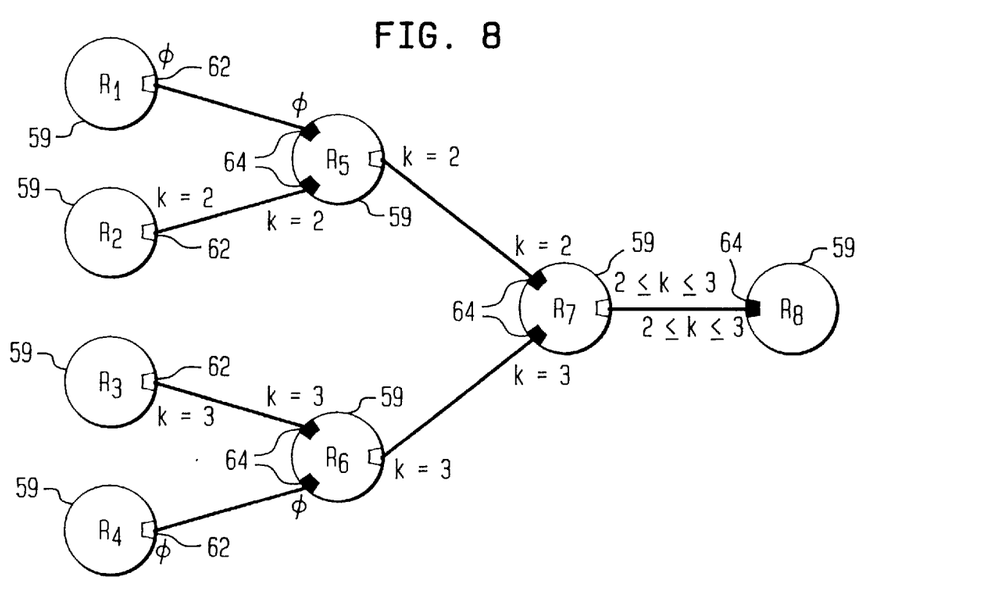
FIG. 8 is an example of passive indexing for one embodiment of the invention.

A passive index is illustrated in FIG. 8, which realizes an indexed file structure. If a token is place in cell R8, it will flow to the cells according to the predicates it satisfies. For example, if the token carries a predicate (2=<k=<3), it will flow to R7, then R5 and R6, and finally R2 and R3.

Figure 9:
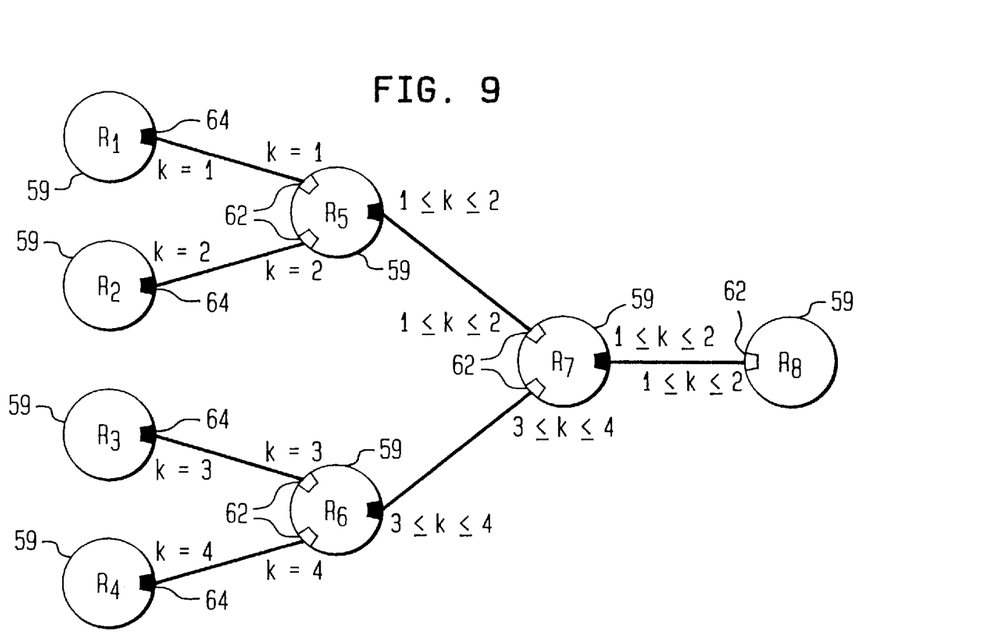
FIG. 9 is an example of active indexing for one embodiment of the invention.

An active index is illustrated in FIG. 9, which can be obtained from the passive index by input-output reversal, i.e. input slots 62 become output slots 64 and output slots 64 become input slots 62. If a token with k=3 is place in the cell R3, it will flow to R6, R7 and R8. Therefore, a passive index and an active index are similar. The difference is that a passive index is activated by a query (placed in cell R3 in the example of FIG. 9), and an active index is activated by environmental changes.

Figure 10A:
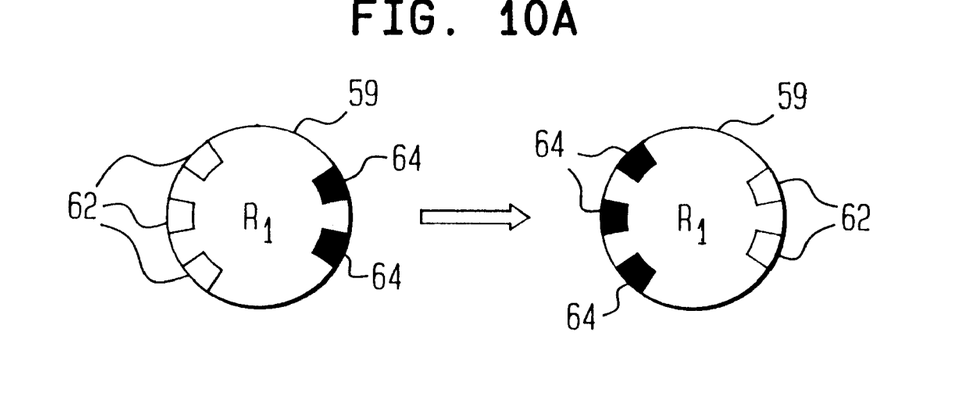
FIG. 10A is a pictorial diagram illustrating input/output reversal for a cell in one embodiment of the invention.
Figure 10B:
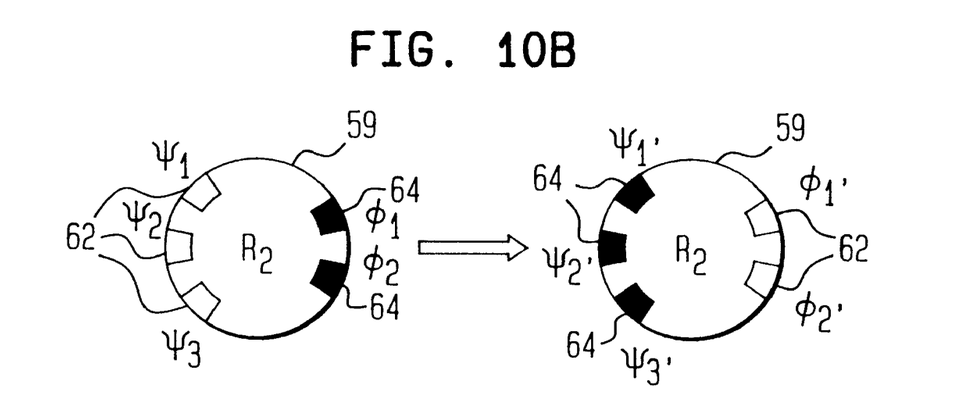
FIG. 10B is a pictorial diagram showing predicate modification in one embodiment of the invention.

FIG. 10A and 10B respectively illustrate two operations on the index structure: (a) input/output reversal, and (b) predicate modification. Input/output reversal reverses the "flow" in an index, and predicate modification changes the predicates associated with a cell, as indicated by the unprimed predicates in an unmodified cell 59, and primed predicates in primed cell 59.

Figure 11:
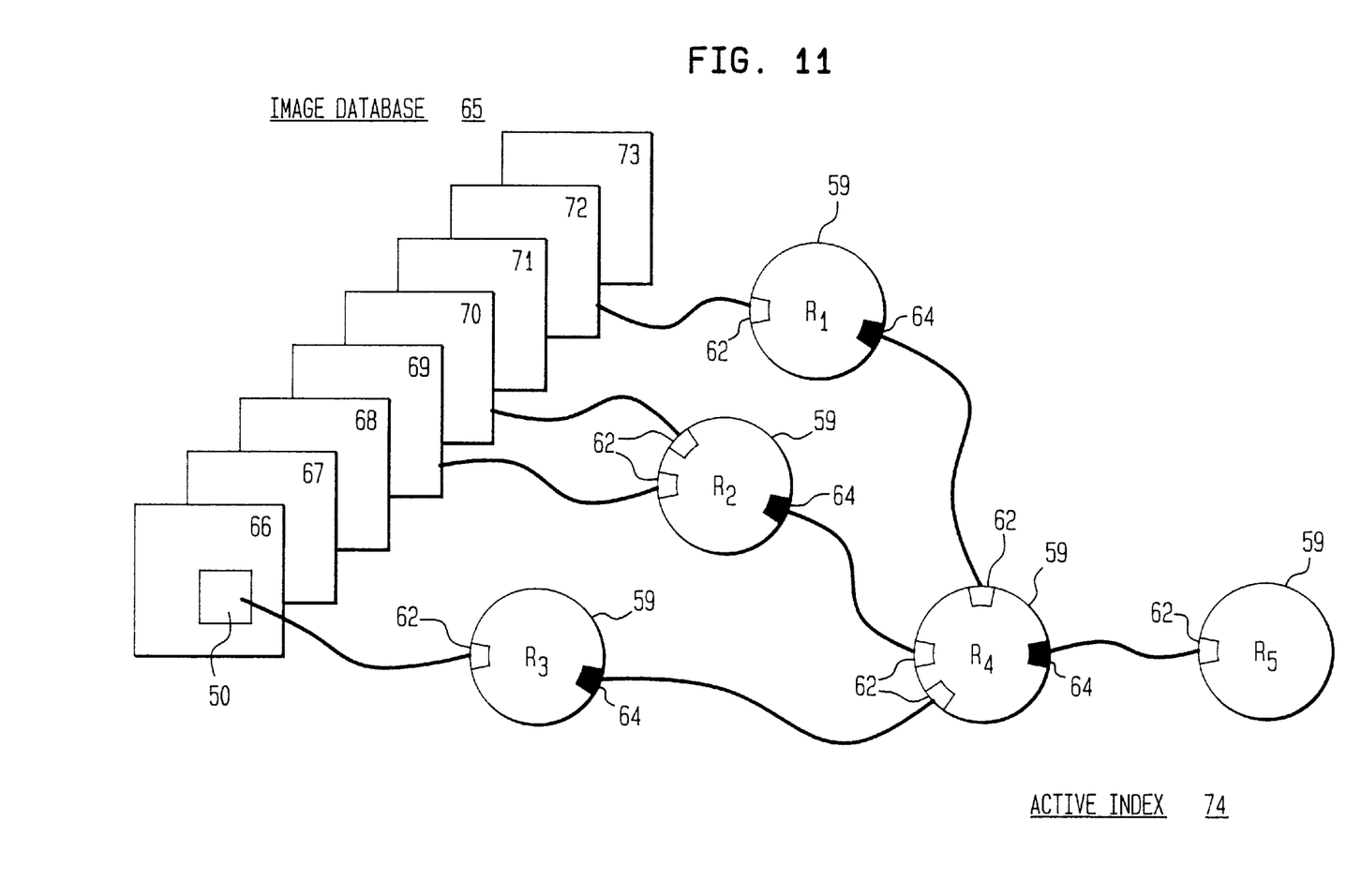
FIG. 11 is a pictorial of an image database with an active index for one embodiment of the invention.

FIG. 11 shows an image database 65 with an active index 74, where R1 is an index on image 72, R2 is an index on images 69 and 70, and R3 is an index on objects in image 66. Images 66 through 73 are included in image database 65.

Extracted features from the images become input tokens to the cells R1, R2 and R3. The active index then can activate other cells 59, leading to the firing of the highest level cell 59 (maybe an icon in the user's window, for example). Using this approach, "hot spots" 50 in images can be defined, which are then connected to the first level active index cells 59. A latent query can be defined for a hot spot 50 so that, for example, a patient's past images 48 of a certain modality are retrieved. Since the active index 74 can be changed into a passive one, by input/output reversal, the index structure can also be used to perform normal search operations, for example,to find similar images (based upon certain spatial relationships among image objects).

The following scenario explains the dynamic behavior of the active index structure and its relations to hot spots: Suppose a hot spot 50 is created by the user on the current image 48. This leads to the retrieval of related images 48. Once these images 48 are retrieved, the hot spot 50 is propagated to the related images 48. Finally, to compare related images 48 and produce a result, the working storage and the active index structure 52 are changed successively as indicated in the following discussion,

Initially, assume only the image I1 is in the working storage 6. At this time, the protocol state is in state S1, thus focussing on certain hot spot types A and B, for example. When the user creates a hot spot 50 on the current image 48, the hot spot O1 is associated with I1. The hot spot O1 is a 1-level index. It has an associated action that is now performed to retrieve related images I2 and I3. I2 and I3 are moved into the working storage, as indicated below:

```
I1- -O1
I2
I3
```

Using the hot spot object hierarchy, the hot spot is propagated to related images, as indicated below:

```
I1- -O1
I2- -O2
I3- -O3
```

The above hot spots can be used for active indexing. For example, if something unusal happens in I2, O2 will fire, etc. Since O1, O2 and O3 are in the same object class, the active index is structured as follows:

The above structures can also be used as a passive index. If a token is sent to O4, it will flow to O1, O2, and O3 to retrieve I1, I2 and I3. Thus, the action "compare similar images" may be invoked as the side effect to some other hot spots being triggered (or could be still the result of O1 being triggered), and a token flows into O4, etc. At this time, the protocol state transits to S2. The state transition is caused by the completion of the comparative study of related images.

The index structure, once created, can be modified when new hot spots 50 are created. Moreover, the index structure can be copied from smart images to smart images. As more information on the usage of the smart images is obtained, genetic algorithms can be developed to selectively copy some index structures, and discard others. Thus, a smart image can incrementally increase its intelligence.

An active index structure 52 indexes on environmental changes, and primarily acts to permit token flow, and provides a secondary function in performing certain actions.

Although various embodiments of the invention have been shown and described herein, they are not meant to be limiting. Those of skill in the art may recognize modifications to various ones of these embodiments, which modifications are meant to be covered by the spirit and scope of the appended claims.

What is claimed is:

1. A method for providing a smart image system in a computer workstation for processing image information related to one or more objects, said workstation including at least a display, a main memory, a working memory, a microprocessor, and a control panel for interfacing with a user, said method comprising the steps of:

establishing a protocol manager for permitting a user to create, update, and retrieve protocols from a protocol set, each of said protocols including a sequence of user steps for conducting image processing or analysis, said protocol set being stored in said main memory;

storing in said main memory a hot spot set comprising a plurality of hot spots each for association with an area of interest on an image being processed, each hot spot having a unique statement of inquiry associated with it for forming a predicate;

establishing a hot spot manager for automatically providing predicate evaluation of a hot spot selected by a user, action scheduling in response to the predicate evaluation, and invocation for actions to be taken;

storing in said main memory a local set of smart images created by a user, for individual access by a user for updating and other processing;

storing in said main memory a smart image database containing data including references to raw images, and knowledge structures for association with individual ones of said raw images, respectively, thereby completing the formation of said smart images from said raw images, respectively;

establishing a smart image database manager for permitting a user to manage smart images, generate smart images, and update said smart images in a smart image working set;

storing in said main memory a plurality of image processing routines; and establishing a smart image engine responsive to events initiated by a user for invoking any required action of said protocol manager, said hot spot manager, and said smart image database manager, for transferring smart images to said main memory, and processing said smart images;

operating said smart image engine to provide each smart image as a composite of a raw image with an associated knowledge structure; and said knowledge structure including a selected protocol from said protocol set, associated ones of said set of hot spots for selection by a user, active indexes for connecting related hot spots for obtaining system responses to environmental changes, attributes for domain related information and image related information, including identifying names, image type, image size, and voice diagnosis, and further including relations to other images.

2. The method of claim 1, further including the steps of:

monitoring a user's requesting for association with a user selected area of a current image being observed by the user, a hot spot in an image being processed and shown on said display;

monitoring a user's present protocol state; and activating corresponding active indexes in response to both the user's request for a particular hot spot, and protocol state, for prefetching related images with said working memory in anticipation of a user's next step in the monitored protocol state.

3. The method of claim 2, further including the step of preprocessing the prefetched image information.

4. The method of claim 3, wherein said preprocessing step further includes the step of propagating the hot spot, selected by the user for the image being displayed, to each one of the prefetched related images for association with a user designated area, respectively, relative to a present image on display.

5. The method of claim 3, wherein said preprocessing step further includes the step of:

creating a hot spot group including hot spot instances for prefetched images, respectively, of an object under study.

6. The method of claim 5, wherein said preprocessing step further includes the step of:

creating hot spot groups for hot spot instances of images of different modalities, respectively, of an object under study.

7. The method of claim 6, further including the step of:

recomputing the size of said hot spots for each associated one of images of different modalities, respectively.

8. The method of claim 7, further including the step of:

establishing a hierarchy of said hot spots for defining links between said prefetched image information; and propagating via said established links the hot spot selected by the user for the image being displayed, to each one of said prefetched images.

9. The method of claim 8, further including the step of:

comparing related images for identifying similar features in said images, and differences between these similar features.

10. The method of claim 3 , further including the step of:

initiating said preprocessing step for performing predetermined actions if the predicate of a hot spot of an image being displayed is true.

11. The method of claim 1, further including the step of:

providing a jump exception for permitting a user to select an image processing step outside of the predetermined sequence of steps of a user's protocol.

12. The method of claim 1, further including the step of:

establishing feature based indexes for performing determined actions if a hot spot associated with an image being processed satisfies predetermined spatial relations.

13. The method of claim 1, further including the step of operating said smart image engine to provide each smart image as a composite of a raw image with an associated knowledge structure;

said knowledge structure including a selected protocol from said protocol set, associated ones of said set of hot spots for selection by a user, active indexes for connecting related images for obtaining system responses to environmental changes, attributes for domain related information and image related information, including identifying names, image type, image size, and voice diagnosis, and further including relations to other images.

14. The method of claim 1, further including the step of:

providing a user interface for permitting a user to exercise said smart image engine.

* * * * *